Dec. 26, 1961  D. K. HOBBS  3,014,609
INSERTS FOR CONSTRUCTIONS OF SHEET METAL
OR OTHER SHEET MATERIALS
Original Filed June 15, 1959

Inventor
DORAN KEMSLEY HOBBS
By Irwin S. Thompson
Attorney

United States Patent Office 3,014,609
Patented Dec. 26, 1961

3,014,609
INSERTS FOR CONSTRUCTIONS OF SHEET METAL
OR OTHER SHEET MATERIALS
Doran Kemsley Hobbs, Brighton, England, assignor to
The Talbot Tool Company Limited, Brighton, England,
a company of Great Britain
Original application June 15, 1959, Ser. No. 820,482.
Divided and this application July 12, 1960, Ser. No.
42,271
Claims priority, application Great Britain June 24, 1958
1 Claim. (Cl. 218—29)

This invention relates to inserts for constructions of sheet metal or other sheet materials.

In a wide variety of industries, of which the manufacture of radio equipment, aircraft and scientific instruments are examples, there are commonly employed constructions of sheet metal in which it is desired to provide an internally threaded or plain bush, or an upstanding solid pin, which is normally inserted into, and secured in, an aperture stamped in the sheet. A known insert of this kind comprises an internally screw-threaded bush having at one end a thin-walled coaxial short tubular extension of smaller external diameter, which projects through an aperture in a metal plate and on the opposite side of the plate is splayed out after the fashion of a rivet to secure the insert to the sheet. Since the extension is a continuation of the inner surface of the bush there is a danger that the riveting operation will distort the inner shape and/or the screw-threading in the bush; and an insert of this kind will clearly not allow the bush to project from both sides of the sheet which is sometimes desirable.

The object of the present invention is to provide an insert free from the abovementioned limitations, and with this end in view the invention consists in an insert for use in constructions of sheet material comprising a head or flange portion, and a projecting portion adapted to pass through an aperture in the sheet material, wherein the projecting portion is externally of different lateral dimension along its length extending from the head or flange (e.g. is stepped at a suitable point along its length).

The invention further consists in a method of securing a headed or flanged insert to sheet material wherein a projecting portion of the insert is passed through an aperture in the sheet and a portion of material comprised in the outer surface of the projecting portion of the insert is caused by a tool to peel off or flow from the projecting portion and is compressed by the tool against the surface of the sheet material, and in co-operation with the head or flange holds the insert firmly in the sheet. The operation may be envisaged as a shearing off of the outer layer of the projecting portion of the insert, and forcing it, rivet-fashion, against the sheet material, and this can be effected without any distortion or damage to the inner part of the projecting portion, which remains standing and which may be solid or hollow, and in the latter case internally smooth or screw-threaded. It will be noted that an insert such as specified in the next preceding paragraph lends itself conveniently to the aforesaid method of fixing the insert, since variations of lateral external dimension of the projecting portion of the insert facilitates the "peeling off" of the outer layer to form a securing flange.

The invention also consists in a tool for carrying out the method specified in the next preceding paragraph comprising a punch or pressure element of tubular metal construction (having any desired internal cross-section) adapted to engage telescopically on to the projecting portion of the insert, and having at its nose a pressure surface formed to "peel" outer surface portions away from the insert projection, and to force them as a securing flange or the like against the sheet material. Conveniently the annular nose surface of this tool is of frustoconical form with a contained angle of 160°. The inner edge of this annular surface effects a cutting operation, and the shaved-off material is compressed by the annular surface against the sheet material.

While the invention is intended more especially for fixing metal inserts to metal sheet, the use of other materials, e.g. synthetic resins, for either, or both, the inserts and the sheet is not excluded from the scope of the invention.

The present application is divided from my pending patent application Ser. No. 820,482, filed on June 15, 1959, to which reference should be made for details of, and claims directed to, the forms of insert for which the method set out in the present specification is more especially intended.

The invention will be clearly understood from the following description of forms (given, however, merely by way of example) which it may assume, and this description will be more readily followed by reference to the accompanying drawings wherein.

Figure 1:
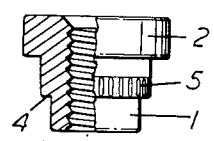
FIGURES 1, 2 and 3 represent in side sectional (or part sectioned) elevation three different forms of metal insert according to the invention.

In carrying the invention into effect in one convenient manner, as shown in the aforesaid drawings, inserts for fixing in a plate may comprise an internally screw-threaded circular cylindrical body portion 1 (which may be of substantial length if desired) with a head portion or shoulder flange 2. This head portion 2 may be formed at the end of the body 1 (FIGURES 1 and 3), or the body 1 may project beyond the shoulder flange 2 (FIGURE 2) if desired, as at 3. Near to and beneath the head or flange 2, the body is of enlarged diameter forming a step 4, and preferably the periphery of this step is milled, knurled or otherwise roughened as at 5 (FIGURE 1). Alternatively, or in addition, the undersurface of the head or of the shoulder flange may be milled, knurled or otherwise roughened.

Figure 2:
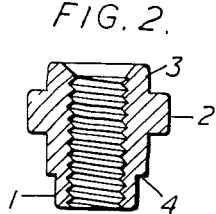
Figure 3:
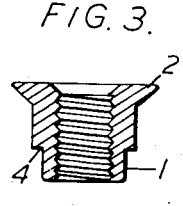

An insert such as shown in FIGURES 1, 2 or 3 is fixed in a plate by inserting it in an aperture, preformed, e.g. by stamping, in the plate, the diameter of the aperture being large enough to accommodate the enlarged portion of the body 1 so that the head 2 is seated on the plate. A tool is then applied to the step 4 of the body 1, and forced by pressure and/or by repeated percussion towards the plate so that it shears off the outer layer of the body portion, and causes it to "flow" and expand in order to form an annular flange 6 (FIGURES 6 and 7) pressed against the plate (and into any annular gap left between the body and apertures if the insert is a loose fit) the plate being firmly secured between this flange 6 and the head 2. The roughened or irregular surface of the layer of the insert which is sheared off and pressed against the plate grips the insert thereto and prevents rotation.

Figure 4:
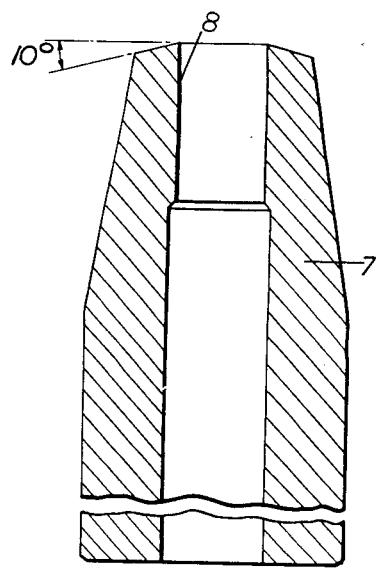
FIGURE 4 represents in axial section a tool according to the invention for affixing inserts such as shown in FIGURES 1–3.

A form of tool suitable for this operation according to the invention is shown in FIGURE 4, and comprises a hard-steel punch-like shank 7 tapered towards its working end and formed with an axial bore 8 having a sliding fit on the body portion 1 of an insert. The front annular surface of the tool engages on the step 4 of the insert (of which the head 2 is located against a suitable bearing or anvil-surface), and force or repeated blows applied axially to the tool, with the result that its forward end shears or "peels off" the layer of material, around the body 1 of the insert, defined by the step 4, as shown diagrammatically in FIGURE 5, and eventually forces this material against the plate 9 as a retaining annulus 6.

The front annular end of the tool 7 may be of any convenient shape but is preferably a conical annulus, as shown in FIGURE 4, and preferably its surface is inclined by 10° to the plane perpendicular to the tool axis, i.e. the apex angle of the conical annulus of the tool is preferably 160°.

In modified forms of the tool which may be employed the conical annular nose of the tool may be of any other convenient angle, and may be recessed, or of concave radial cross-section, and/or may be stepped or interrupted and/or grooved (which may allow the knurling or other roughening of the insert to be dispensed with).

Figure 5:
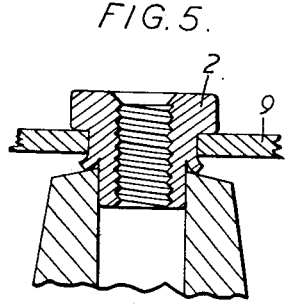
FIGURE 5 represents in side section an intermediate stage of the fixing of an insert according to the invention.
Figure 6:
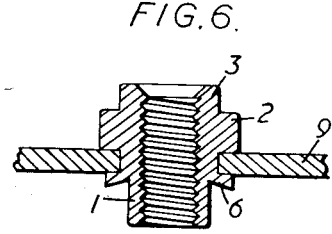
FIGURES 6 and 7 represent in side section two forms of insert according to the invention when affixed to a plate.
Figure 7:
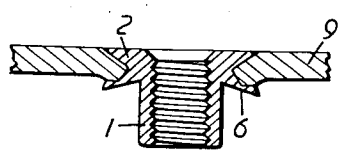

When fitted to a plate the head 2 (FIGURE 1), or the shoulder 2 and projection 3 (FIGURE 2) of the insert stand up from the plate, as seen in FIGURES 5 and 6. The form of head shown in FIGURE 3 in intended to ensure a flush fitting with the plate, and for that purpose the undersurface of the head may be of conical form inclined at, say, 45° to the insert axis (i.e. a conical annulus of 90° apex angle) or any other convenient angle. Alternatively a wedge-like frusto-conical head may be formed with its side inclined at a small angle, e.g. 10°, to the insert axis, providing a conical annulus of 20° apex angle. It is found that when this is affixed to the plate 9 in the manner indicated above the metal round the plate aperture is induced to "flow" in a manner similar to a downward curving of the aperture edge (FIGURE 7) and ensures that the head 2 is substantially completely flush with the surface of the plate 9.

In any form of the invention described above modifications may be introduced with a view to reducing the operating pressure and/or facilitating operation of the tool. For example the body 1 of the insert, e.g. along its enlarged portion, may be fluted or scalloped or of toothed cross-section similar to a gear wheel, in which case the tool may shear-off and compress into lugs, or an annulus, only the outer part of the projection, e.g. the flutes or teeth. Furthermore the body may be provided at a suitable point with a peripheral groove to allow space for accommodation of compressed metal: e.g. a peripheral groove immediately beneath the conical head of the insert shown in FIGURE 3 allows space for the metal of the plate and thus facilitates close flush fitting. To facilitate withdrawal the bore at the nose of the tool may be slightly tapered, i.e. slightly increasing in internal transverse dimensions as it proceeds inwardly from the nose. As shown the tool is preferably hollow from end to end to allow an ejection element to extend therethrough in order to facilitate separation of the tool from an insert.

It will be appreciated that the essence of the invention consists in causing "fluid-flow" of material from the outer surface of the upstanding part of the insert, so that it forms a projection, such as an annulus or lug, integral with the insert, hard against the plate in which the insert is to be fixed, thereby, in association with the head of the insert, clamping the insert in position in the plate. The "fluid-flow" is effected by pressure or stamping, or by a percussive operation, but the invention is not otherwise limited to the means whereby this result is achieved. Thus it will be clear that while the projecting portion of the insert may conveniently be stepped, as above described, in order to facilitate action of a tool in shearing off an outer stratum, it would be possible for the projecting portion to be a plain cylinder throughout, in which case the layer of material to be sheared off and compressed by the tool would extend to the extremity of the projection. This would be more especially useful if the projection were comparatively short. Alternatively the base portion of the projection may be of conical or pyramidal form, and the divergent portions of metal be sheared and compressed by the tool during the fixing operation. Furthermore the cross-section of the insert, and/or of the tool internally, need not be circular, and/or need not be the same. For example a tool of triangular, rectangular or polygonal internal shape might be employed with an insert having a circular cylindrical projection as described above, or a tool with circular internal cross-section applied to a triangular, rectangular or polygonal projecting portion (stepped or not) of the insert. In such circumstances the sheared and compressed metal might not form an annular securing flange, but might, for example, form clamping lugs against the plate extending in different lateral directions from the axis of the insert. Such elements may be employed in cases where it is desired that the insert upstanding from the plate shall have a triangular, rectangular or other external cross-section. It is also useful if the insert is to form a comparatively long wall or rib, or a slotted member.

While the invention is intended more especially for fixing metal inserts in metal plates, the invention may also employ inserts and/or plates of other material, e.g. synthetic plastics. It is within the scope of the invention to preheat, or to provide heating means, e.g. an electric heating coil, if desired, for, either or both the tool and the insert, in order to facilitate the "fluid-flow" of material during the fixing operation; and/or to rotate the tool about its own axis by suitable means during a pressing operation.

From the above description it will be seen that the invention provides a simple and effective method of fixing inserts in a plate, and suitable inserts and a convenient tool for practising that method, but it should be understood that the invention is not limited solely to details of the forms described which may be modified, in order to meet various conditions and requirements encountered, without departing from the scope of the invention.

What I claim is:

A method of securing in a sheet of material an insert having a hollow cylindrical body consisting of a body portion of larger diameter which is reduced to an adjacent body portion of smaller diameter to form a step at the junction therebetween, and, at the end of said body portion of larger diameter, a head having a substantially flat outer surface, and an annular frusto-conical undersurface inclined to the axis of said body by an angle of approximately 10°, said method comprising the steps of forming in said sheet an aperture to receive said body portion of larger diameter, fitting said insert into said aperture with said undersurface of said head abutting on one surface of said sheet, bringing the outer surface of said head against an anvil surface, engaging a hollow tool over said insert body portion of smaller diameter, advancing said tool to said step, applying force to said tool to cause it to shear away a uniform substantially annular portion of material from the surface of that part of said body portion of larger diameter projecting beyond said aperture, compressing said uniform portion of material integral with said insert as an annulus bearing against the other surface of said sheet opposite to said one surface on which said head abuts, and simultaneously pressing said sheet and said head together against said anvil surface, causing sheet material round said aperture to yield whereby said head is sunk to a flush fit in said one surface of said sheet, and said insert thus being clinched firmly in said aperture by the gripping of the sheet between said head and said annulus which are respectively on opposite sides of said sheet.

References Cited in the file of this patent

UNITED STATES PATENTS 1,883,906    Hasselquist               Oct. 25, 1932

(Other references on following page)

UNITED STATES PATENTS

| | | |
|---|---|---|
| 1,896,028 | Burvenick | Jan. 31, 1933 |
| 1,919,552 | Hasselquist | July 25, 1933 |
| 2,007,179 | Bullis | July 9, 1935 |
| 2,174,549 | Blaho | Oct. 3, 1939 |
| 2,183,641 | Double | Dec. 19, 1939 |
| 2,383,623 | Spicer | Aug. 28, 1945 |
| 2,465,534 | Havener | Mar. 29, 1949 |
| 2,594,840 | Allison | Apr. 29, 1952 |
| 2,652,942 | Muchy | Sept. 22, 1953 |
| 2,750,660 | Newcomb | June 19, 1956 |
| 2,970,370 | Weaver | Feb. 7, 1961 |